US005175568A

United States Patent [19]

Oyamaguchi et al.

[11] Patent Number: 5,175,568

[45] Date of Patent: Dec. 29, 1992

[54] PROCESS AND APPARATUS FOR FORMING IMAGE ON NOVEL RECORDING MEDIUM

[75] Inventors: Akira Oyamaguchi; Yasuo Katano, both of Yokohama; Kiyofumi Nagai, Machida, all of Japan

[73] Assignee: Ricoh Company, Ltd., Tokyo, Japan

[21] Appl. No.: 767,814

[22] Filed: Sep. 30, 1991

[30] Foreign Application Priority Data

Oct. 24, 1990 [JP] Japan ........................ 2-286069

[51] Int. Cl.$^5$ ........................ G11B 3/00; G01D 9/00

[52] U.S. Cl. ........................ 346/151; 346/1.1

[58] Field of Search ........................ 346/1.1, 151

[56] References Cited

U.S. PATENT DOCUMENTS 3,910,187 10/1975 Cords ........................ 430/302
5,010,356 4/1991 Albinson ........................ 346/140 R

*Primary Examiner*—George H. Miller, Jr.
*Attorney, Agent, or Firm*—Oblon, Spivak, McClelland, Maier & Neustadt

[57] ABSTRACT

A process of the present invention forms an image on a recording medium, a surface of the recording medium having a characteristic in which a receding contact angle decreases when the recording medium is heated under a condition in which a liquid is in contact with the surface of the recording medium. The process includes following steps of: bringing a liquid into contact with the surface of the recording medium; selectively heating the surface of the recording medium in accordance with image information, whereby an adhesion area having the receding contact angle corresponding to a temperature on the surface of the recording medium heated is formed, as a latent image, on the surface of the recording medium; and adhering a solid ink to the adhesion area so that the latent image formed on the recording medium is developed. The solid ink is defined as an ink whose softening temperature is higher than a room temperature and lower than a temperature at which the receding contact angle on the surface of the recording medium starts to decrease.

34 Claims, 11 Drawing Sheets

PROCESS AND APPARATUS FOR FORMING IMAGE ON NOVEL RECORDING MEDIUM

BACKGROUND OF THE INVENTION (1) Field of the Invention

The present invention generally relates to a process and apparatus for forming an image on a novel recording medium, and more particularly to a process and apparatus for forming an image on a novel recording medium, the recording medium having a characteristic in which a receding contact angle decreases when the medium is heated in a condition where the medium is in contact with a contact material such as a liquid.

(2) Description of Related Art

An offset printing method using a printing plates without water (water for moisturizing) is a typical one of methods in which a recording medium is divided into areas where it is easy for liquid to adhere thereto and area where it is hard for the liquid to adhere thereto. However, in this offset printing method, it is difficult to incorporate a process for manufacturing printing plates from original plates and a process for printing from the printing plates into a single apparatus. This makes it difficult to have a compact printing apparatus.

For example, even in a case of relatively compact offset printing apparatus, a plate making apparatus and a printing apparatus are separated.

To eliminate this fault of the offset printing method, there has been proposed a recording method and apparatus in which areas where it is easy for the liquid to adhere thereto and areas where it is hard for the liquid to adhere thereto than be formed in accordance with image information and in which the recording medium can be repeatedly used (a process for forming an image is reversible). The following are some of these.

① Water-soluble developing method

After a charge has been applied from an external device to a hydrophobic photo-electric layer, a medium having the hydrophobic photo-electric layer is exposed so that a pattern having hydrophobic portions and hydrophilic portions is formed on the surface of the hydrophobic photo-electric layer. Then, a water soluble developing solution adheres to only the hydrophilic portions and is transferred to a paper or the like. Such methods and apparatus are disclosed in Japanese Patent Publication Nos. 40-18992, 40-18993 and 44-9512 and Japanese Patent Laid Open Publication No. 63-264392, etc.).

② Method using a photo-chemical response of a photochromic material

In this method, an ultraviolet light is irradiated to a layer which contains a material such as a spiropyran or an azo dye so that a photo-chemical reaction occurs to make the photo-chromic material hydrophilic. Such method and apparatus are described in "Japanese Journal of Polymer Science and Technology" Vol. 37, No. 4 page 287, 1980).

③ Method using an action of an internal biasing forces

In this method, amorphous substances and crystalline substances are formed in a recording medium by a physical transformation, so that portions where it is easy for a liquid ink to adhere thereto and portions where it is hard for the liquid ink to adhere thereto are formed on the recording medium. An example of such is disclosed in Japanese Patent Laid Open Publication No. 54-41902.

According to the previously described method ①, after the water-soluble ink is transferred to the paper or the like, the hydrophilic portions are removed by removing the charge so that it is possible to record other image information. That is, one original plate (photo-electric member) can be repeatedly used for printing images. However, in this method, an electrophotography process is basically used, so that a long time is required for carrying out the process involving steps cf charging, exposing, developing, transferring and discharging. Therefore, it is difficult to make an apparatus compact, to reduce its cost and to make an apparatus in which it is unnecessary to maintain.

In the method ② described above, it is possible to freely control the reversibility of the hydrophilic and hydrophobic properties by selective irradiation of ultraviolet and visible light. However, since a quantum efficiency is very small, a response time is extremely long and a recording speed is low. In addition, there is also a fault of image instability. Therefore, this method has still not put into practical use.

Furthermore, an information recording member (the recording medium) which is used in the method ③ has stability after an image is formed thereon, but there are occasions structural transformation occurs in the information recording member due to temperature changes prior to the recording. That is, the method ③ has a disadvantage in that it is difficult to maintain the image on the information recording member. In addition, when recorded information patterns is removed, a thermal pulse must apply to the information recording member and then it is necessary to rapidly cool the information recording member. Therefore, it is difficult to perform frequent repetition of image formation.

In a case where ink which is in liquid is used as the recording agent or both the contact material and the recording agent, as the viscosity of the ink is low and the surface of the ink is a free surface, the surface unstably moves when developing. When a plurality dot areas adjacent to each other are developed by the liquid ink, there is a problem in that the ink dots adhered to the dot areas mutually affect each other so that the amount of ink dot adhered to a dot area differs from the amount of ink dot adhered to another dot area. In a case where an apparatus for forming an image by use of the liquid ink is carried, there is a possibility that the ink is slopped out from a container. Thus, it is difficult to handle the apparatus in which the liquid ink is used. In addition, as the liquid ink easily blots on a recording paper, it is difficult to obtain an image having a high quality.

SUMMARY OF THE PRESENT INVENTION

Accordingly, a general object of the present invention is to provide a novel and useful process and apparatus for forming an image on a recording medium in which the disadvantages of the aforementioned prior art are eliminated.

A more specific object of the present invention is to provide a process and an apparatus for forming a recording medium in which a predetermined pattern area can be selectively or selectively and reversibly formed on the surface of the recording medium.

Another object of the present invention is to provide a process and an apparatus for forming a recording medium in which an image transferred from the recording medium to the recording sheet can be maintained in high quality for a long time even when an environment of the image formed on the recording sheet varies.

Furthermore, another object of the invention is to provide an apparatus for forming an image on a recording medium which can be easily handled without slopping out the ink from the container.

The above objects of the present invention are achieved by a process for forming an image on a recording medium, a surface of the recording medium having a characteristic in which a receding contact angle decreases when the recording medium is heated under a condition in which a liquid is in contact with the surface of the recording medium, the process comprising the following steps (a) through (c) of: (a) bringing a contact material into contact with the surface of the recording medium, the contact material being selected from a liquid, vapor and a solid which generates or changes to either a vapor or a liquid under a condition of a temperature lower than a temperature at which the receding contact angle on the surface of the recording medium starts to decrease; (b) selectively heating the surface of the recording medium in accordance with image information, whereby an adhesion area having the receding contact angle corresponding to a temperature on the surface of the recording medium heated by the step (b) is formed, as a latent image, on the surface of the recording medium; and (c) adhering a solid ink to the adhesion area so that the latent image formed on the recording medium is developed, the solid ink being defined as an ink whose softening temperature is higher than a room temperature and lower than a temperature at which the receding contact angle on the surface of the recording medium starts to decrease.

The above objects of the present invention are achieved by an apparatus for forming an image comprising: a recording medium which has a surface having a characteristic in which a receding contact angle decreases when the recording medium is heated under a condition in which a liquid is in contact with the surface of the recording medium; first heating means, coupled to the recording medium, for selectively heating the surface of the recording medium in accordance with image information; first supplying means, coupled to the recording medium, for supplying a contact material to the surface of the recording medium, the contact material being selected from a liquid, vapor and a solid which generates or changes to either a vapor or a liquid under a condition of a temperature lower than a temperature at which the receding contact angle on the surface of the recording medium starts to decrease, wherein an adhesion area is formed, as a latent image, on the surface of the recording means when the surface of the recording medium is heated by the first recording means under a condition in which the contact material supplied from the first supplying means is in contact with the surface of the recording medium, the adhesion area having the receding contact angle corresponding to a temperature on the surface of the recording medium heated by the first heating means; and adhering means, coupled to the recording means, for adhering a solid ink to the adhesion area so that the latent image formed on the recording medium is developed, the solid ink being defined as an ink whose softening temperature is higher than a room temperature and lower than a temperature at which the receding contact angle on the surface of the recording medium starts to decrease.

According to the present invention, the recording medium having a characteristic, in which the receding contact angle is decreased when the recording medium is heated under a condition where the liquid is in contact with the recording medium, is used to form an image. Thus, a pattern area on which the receding contact angle is decreased can be easily selectively formed on the recording medium. In a state where the pattern area is formed, when the recording medium is heated without liquid, the receding contact angle on the pattern area is returned to the original value. That is, the pattern area is disappeared from the recording medium.

In the present invention, as the solid ink which is in solid at an approximately room temperature, the ink dots on the dot areas do not mutually affect each other when developing. In addition, as the image is formed by the solid ink on the recording paper, there is no problem regarding the blot of ink. Further, as the solid ink is not slopped out from the container at the room temperature, it is easy to handle the apparatus.

Additional objects, features and advantages of the present invention will become apparent from the following detailed description when read in conjunction with the accompanying drawings.

DETAILED DESCRIPTION OF THE INVENTION

Figure 1A:
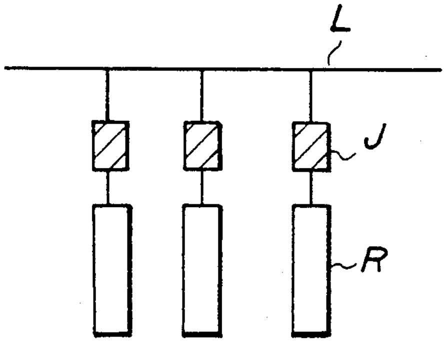
FIGS. 1A through 1D are views indicating models of the structure of a material having a surface self-orientation function.

The inventors of the present invention carried out much research and investigation regarding a novel recording method in which the faults described for the conventional technologies had been eliminated. As a result of this, the inventors discovered that a member having the following characteristics is effective as a recording medium.

When an area on the surface of the member is heated in a condition of being in contact with the liquid and then cooled, a receding contact angle of the area becomes smaller. After that, when the area is heated in a condition in which the liquid has been removed, the receding contact angle of the area becomes larger and returns to an original value. The receding contact angle of the area can be controlled in accordance with a temperature of the heated area.

One of the members having the above characteristic is a first member (1) in which the surface portion thereof includes an organic compound having a surface self orientation function with a hydrophobic group, or a second member (2) in which the surface portion thereof is an organic compound having the hydrophobic group which is oriented to the surface.

The "surface self orientation function" in the first member (1) is defined as a function whereby the hydrophobic group at the surface is oriented towards the side of the air (i.e. the side with the free surface) when a solid comprising a base member and an organic compound formed on the base member or a solid organic compound is heated in the air. This definition is also used for the second member (2). In general, an organic compound offers a phenomena in which a hydrophobic group is easily oriented towards the side of a hydrophobic atmosphere. As the orientation is towards the side at which the interfacial energy of the solid-gas boundary decreases, the above phenomena occurs. In addition, this phenomena is remarkable for the longer the molecular chains of the hydrophobic group, because the larger the molecular chain the mobility of the molecule becomes larger.

More specifically, in a case of a molecule which has a hydrophobic group at an end thereof (i.e. a molecule in which the surface energy is low), the hydrophobic group is easily oriented in a direction of the side of the air (i.e. the side with the free surface). In the same manner, in a case of chain molecules which include $—CH_2$ $n$, $—(CH_2)_n$ portions are flat and easily oriented. In addition, in molecules which include

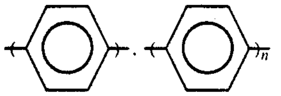

portions also have a flat structure and are easily oriented. Especially, the chain molecules including a chemical element in which an electronegativity is large, such as a fluoride, have a large self aggregation. In the chain molecules, a mutual molecular chains are easily oriented.

To summarize the results of these investigations, in a chain molecule which includes a molecule having a large self aggregation or a molecule having a flat structure and has the hydrophobic group at an end thereof, or in an organic compound including the above chain molecule, the surface self orientation function is large.

As is clear from the preceding discussion, there is a relationship between the surface self orientation and the receding contact angle. In addition, there is also a relationship between the receding contact angle and the liquid adhesiveness. That is, the adhesion of the liquid to the surface of the solid mainly occurs due to a tacking force for tacking the liquid at the surface of the solid. The tacking force can be regard as a type of friction which is generated when the liquid slides against the surface of the solid. Thus, in this invention, the "receding contact angle" $\theta_r$ can be denoted by the following formula.

$$\cos \theta_r = \gamma \cdot (\gamma_s - \gamma_{sl} - \pi_e + \gamma_f) / \gamma_{lv}$$

where:

- $\gamma$: surface tension of a solid in a vacuum
- $\gamma_{sl}$: surface tension at the solid-liquid interface
- $\gamma_{lv}$: surface tension of the liquid in a condition in which the liquid is in contact with a saturated vapor
- $\pi_e$: equilibrium surface tension
- $\gamma_f$: friction force
- $\gamma_s$: surface tension of a solid without an absorption layer The above formula is disclosed by Saito, Kitazaki et al, "Japan Contact Adhesive Association Magazine" Vol. 22, No. 12, No. 1986.

According to the above formula, when the receding contact angle $\theta_r$ decrease, the friction force $\gamma_f$ increases. That is, when the receding contact angle increases, it becomes hard for the liquid to slip on the surface of the solid. As a result, the liquid is adhered to the surface of the solid.

As can be assumed from the above mutual relationships, the adhesiveness of the liquid depends on the receding contact angle $\theta_r$. This receding contact angle $\theta_r$ depends on types of materials which have the surface self orientation function at the surface thereof. Hence, in the present invention, it is necessary to forming a predetermined pattern area on the recording medium (A) and/or to make a visible image corresponding to the pattern area by a recording agent (solid ink), so that a member in which the surface thereof has the surface self orientation function is selected as the recording medium (A).

The recording medium (A) used in the present invention has a surface in which the receding contact angle $\theta_r$ decreases when the surface is in contact with the liquid in a condition of heating it.

The recording medium (A) can be of any shapes as long as the surface thereof has the nature described above. Thus, the recording medium (A) can be of a film shape. The recording medium (A) can also have a structure in which a coating film or the like having the nature described above is provided on the surface of a supporting member. The recording medium (A) can be structured by only one member in which the surface thereof has the nature described above.

An area where it is easy for the liquid to adhere thereto, which area is formed on the recording medium (A), becomes either a lipophilic area or a hydrophilic area in accordance with the type of contact material (B). Thus, either oil-soluble ink or water-soluble ink is used for printing an image.

FIGS. 1A through 1D indicate a classification of the types of materials or portions of materials "having a surface for which the receding contact angle $\theta_r$ decreases when the material is heated and brought into contact with a liquid". FIG. 1A indicates an example of a compound having a self-orientation function. This compound has a hydrophobic group on the side chains of the macromolecule polymer. The main chain L and the hydrophobic group R are linked by a linking group J.

Figure 1B:
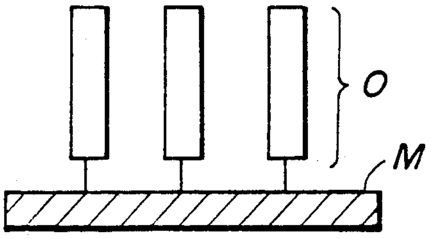
Figure 1C:
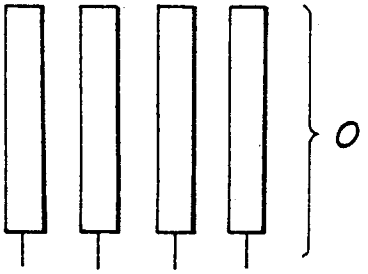

FIG. 1B indicates an example of a material in which the hydrophobic group in an organic compound are oriented towards the surface thereof. The compound O having the previously described hydrophobic group is formed by the physical or chemical linking to the surface of an organic or inorganic material M. FIG. 1C shows an example of a material which is made up of only the organic compound O having the hydrophobic group indicated in FIG. 1B.

Figure 1D:
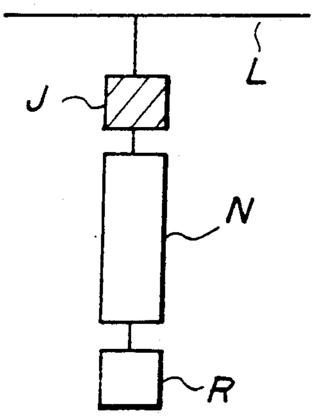

FIG. 1D indicates an example where the chain molecules are in a side chain of a macromolecule. The chain molecules and the main chain L are linked by the linking chain J. This is a compound in which each chain molecule has a molecular chain N having either a flat structure of a self-aggregation and the hydrophobic group R is linked at an end of the molecular chain N.

In the examples shown in FIGS. 1A and 1D, the main chain L of the macromolecule compound can either have a linear shape or a network structure.

In the example indicated in FIG. 1B, as in a case of a deposited Lngmuir-Blodgett film, it is also possible to use a compound O including a hydrophobic group and then deposit a compound O including a hydrophobic group on another one. In the example indicated in FIG. 1C, there is only a compound including a hydrophobic group, with there being no main chain L and no linking to an organic or inorganic material (M) or the like.

The previously described hydrophobic group should desirably have the end molecules as $—CH_3$, $—CF_3$, $—CF_2H$, $—CFH_2$, $—C(CF_3)_3$, $—C(CH_3)_3$ or the like. More desirably however, it is advantageous if this hydrophobic group has long molecules which have a high molecular mobility. Of these, the previously described hydrophobic group can be an alkyl group in which either a fluorine or a chlorine is substituted for at least one hydrogen thereof, which alkyl group has more than one —F and/or —Cl, such as $$—CF_2CF_2\underset{\substack{|\\ Cl}}{C}FCF_2CF_2.$$

The above hydrophobic group can also be an alkyl group having a carbon number equal to or greater than 4. An alkyl group in which either a fluorine (F) or a chlorine (Cl) substituted for at least one hydrogen thereof can be used and it is more effective if an alkyl group in which a fluorine is substituted for at least one hydrogen thereof is used. It is further more effective that a compound has the polymer whose side chain includes fluorine.

The principle of this function is not yet perfectly understood but is assumed to be as described below.

First, it will be considered that the surface of a recording medium (A) formed by this compound described above has a surface on which the hydrophobic group is considerably oriented. Thus, this surface has a liquid repellency property (since the surface energy of the hydrophobic group is the smaller). In this state, when the surface of the recording medium (A) and the contact material (B) are brought into contact and heated, the heating causes the molecular motion of the hydrophobic group to increase and the recording medium (A) and the contact material (B) are interacted with each other. Thus, an orientation state of at least one portion of the recording medium (A) changes into another one (for example, the orientation is disordered). Then the changed state is maintained after the recording medium (A) is cooled. Even if the contact material (B) is either a vapor or a solid before heating, the contact material (B) in contact with the recording medium (A) becomes liquid in the state in which the recording medium (A) is being heated.

Prior to heating, because the hydrophobic group is oriented in the surface of the recording medium (A), the surface energy of the recording medium (A) is extremely low. However, by heating the recording medium (A) in the state where the contact material (B) is in contact therewith, the orientation is disordered and the surface energy increases. The receding contact angle $\theta_r$ is determined by the balance between the surface energy of the solid and surface energy of the liquid. If the surface energy of the solid is high, then irrespective of the type of liquid, the receding contact angle $\theta_r$ will become smaller. Thus, the adhesiveness with respect to the liquid will increase as a result.

Furthermore, after the orientation state in the surface of the recording medium (A) changes into another orientation state or a state in which the orientation is disordered, when the recording medium (A) is heated in a condition where there is no contact material (B), the interaction between the recording medium (A) and the contact material (B) does not occur, so that the recording medium (A) reverses to the former orientation state.

Accordingly, the contact material (B) is not one where it simply performs cooling after the surface of the recording medium (A) has been heated, but is one where there is some kind of the recording medium (A) for the change of state (either a state where there is an orientation different from the former orientation state or a state where the orientation has been disordered) to occur.

As has been described above, when the hydrophobic group of a member (compound) forming the surface of the recording medium (A) is an alkyl, an alkyl group in which either a fluorine or a chlorine is substituted for at least one hydrogen thereof, then it is necessary for the carbon number of the alkyl to be 4 or more. This carbon number equal to or greater than 4 is thought to be the necessary number for active molecule motion when heating is performed, and for a certain degree of orientation of the alkyl on the surface of the recording medium (A). In addition, when the contact material (B) is heated along with the surface of the recording medium (A), it is thought that the molecules of the contact material (B)are incorporated into the molecules of the surface of the recording medium (A). Furthermore, an alkyl group including fluorine or chlorine which has a high electronegativity is used, then there is a large interaction with liquid and particularly liquids having polarity and so there is a larger change in the adhesiveness than in the case of a compound that includes an alkyl group in which there are not fluorine and chlorine. In addition, the alkyl group which includes fluorine has a strong self-aggregation and so the surface self-orientation function is also high. Still furthermore, the alkyl group which includes fluorine has a low surface energy and so have an excellent effect in prevention the surface of the recording medium (A) from being dirtied.

Moreover, the surface of the recording medium (A) has a liquid repellency effect. This may be described in terms of the surface energy of a solid. In the course of the investigation performed by the inventors, it was found that it is desirable as far as use for a recording method is concerned, for this surface energy to be 50 dyn/cm or less. When the surface energy of the recording medium (A) is greater than 50 dyn/cm, the surface of the recording medium is easily wet and it is possible to become dirty with the recording agent.

A detailed description will now be given of a compound forming the surface of the recording medium (A).

A compound in which an alkyl group (which can include fluorine and/or chlorine) is included in the side chain of a polymer can be preferred as the type of compound as shown in FIG. 1A or 1D. More specifically, monomers indicated in (I), (II), (III), (IV), (V), (VI) and (VII) are preferred.

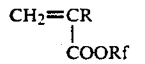
(I)

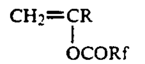
(II)

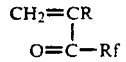
(III)

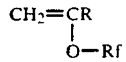
(IV)

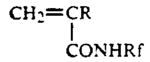
(V)

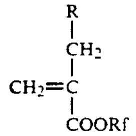
(VI)

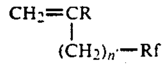
(VII)

R is either —H, $-CH_3$, $-C_2H_5$, $-CF_3$ or $-C_2F_5$.

Rf is either an alkyl group having a carbon number equal to or greater than 4, a group including an alkyl group in which either a fluorine or a chlorine is substituted for at least one hydrogen thereof, or a hydrophobic group in which

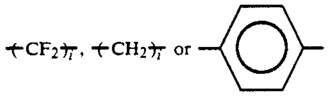

(where i≧4)

n' is an integer and equal to or greater than 1.

Other polymers are those indicated in (VIII), (IX) and (X).

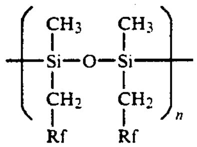
(VIII)

-continued

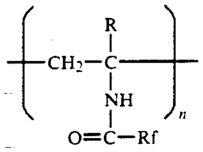
(IX)

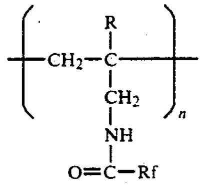
(X)

R is either —H, $-CH_3$, $-C_2H_5$, $-CF_3$ or $-C_2O_5$.

Rf is either an alkyl group having a carbon number equal to or greater than 4, a group including an alkyl group in which either a fluorine or a chlorine is substituted for at least one hydrogen thereof, or a hydrophobic group in which

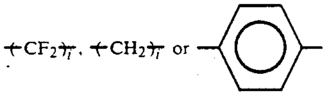

is provided in the molecule chain (where i≧4).

n is an integer and equal to or greater than 10.

In these (I) through, Rf can be as indicated in to the following (1) through (20).

$-CH_2CF_2CHFCF_3$ (1)

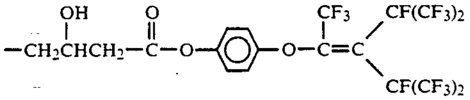
(2)

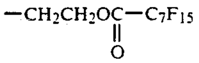
(3)

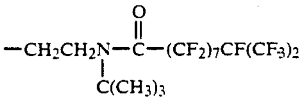
(4)

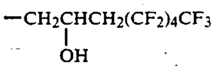
(5)

$-CH_2(CF_2)_{10}H$ (6)

$-(CF_2)_6-O-CF_2CF_3$ (7)

$-(CH_2)_4-NH-CF_2CF_3$ (8)

$-(CF_2)_6-CF_3$ (9)

$-(CH_2)_{10}C_8F_{17}$ (10)

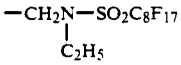
(11)

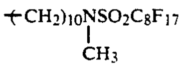
(12)

-continued $-CH_2NHSO_2C_8F_{17}$ (13)

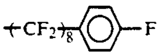 (14)

c.s$-CH_2CH_2-(CF_3)_6CF(CF_3)_2$ (15)

$-CH_2CF_2CF_2CF_3$ (16)

$-CH_2CH_2CH_2CH_2F$ (17)

$-CH_2(CF_2)_6CF_3$ (18)

$-CH_2(CF_2)_5CF_3$ (19)

$-(CH_2)_3CF_3$ (20)

The following material (XI) can be selected for particular consideration from the above compounds.

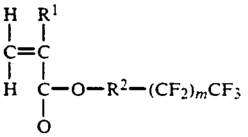 (XI)

where $R^1$ is either hydrogen, $-C_nH_{2n+1}$ or $-C_nF_{2n+1}$ (n is an integer, n=1 or n≧2), $R^2$ is either $-(CH_2)_p$ (where p is an integer, p≧1) or $-(CH_2)_qN(R^3)SO_2-$(where $R^3$ is either $-CH_3$ or $C_2H_5$, q is an integer, q≧1), and m is an integer equal to or greater than 6.

Accordingly, the following compounds are given as the most desirable compound for use as the member for the surface of the recording medium (A) of the present invention.

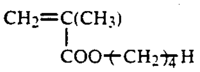

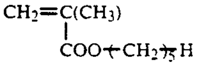

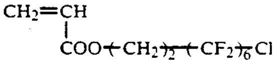

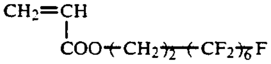

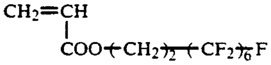

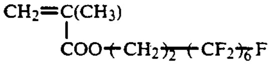

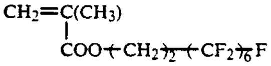

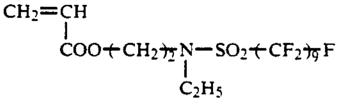

-continued

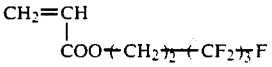

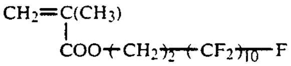

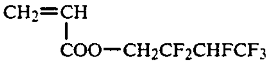

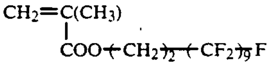

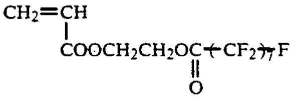

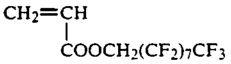

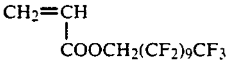

Moreover, a copolymer made of some of monomers indicated in (I) (II) (III) (IV) (V) (VI) (VII) and (XI) and other monomers such as ethylene, vinyl chloride, styrene, butadien, isoprene, chloroprene, vinyl alkyl ether, vinyl acetate and vinyl alcohol can be also used as the compound forming the surface of the recording medium (A).

In addition, a copolymer is made of a monomer represented by the formula (XI) and at least one of the following monomers each having a functional group.

$CH_2=C(CH_3)COO(CH_2)_2OH$ $CH_2=C(CH_3)COOCH_2CH(OH)CH_3$ $CH_2=CHCOOCH_2CH(OH)C_8F_{17}$

As a result, many functional groups are formed in the copolymer. In this manner, the manufactured substance has excellent properties as crosslinking type of polymer. Either formaldehyde, dialdehyde, N-Methylol compounds, dicarboxylic acid, dicarboxylic acid chloride, bis-halogen compounds, bis epoxide, bis aziridine, diisocyanate and the like can be used as the crosslinking agent. The following is one example of a crosslinking polymer obtained in this manner.

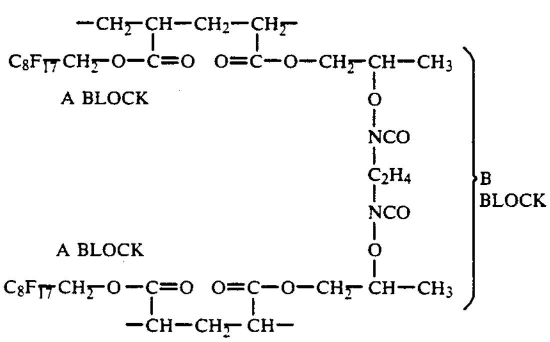

In the above formula, the A block is an alkyl group which brings on the previously described change in the thermal nature. The B block is the agent that crosslinks property of chain polymers (with diisocyanate being used as the crosslinking agent).

A liquid in which the above described copolymer and the crosslinking agent are mixed is coated on a substrate, and then either heating or irradiating electrons or light with respect to the substrate coated the liquid, so that a crosslinked film is formed on the substrate.

The process for obtaining the polymer from the monomer is selected in accordance with materials from solution polymerization, electrolysis polymerization, emulsification polymerization, photo polymerization, radiation polymerization, plasma polymerization, graft polymerization, plasma-iniciated polymerization, vapor deposition polymerization and the like.

A description will now be given of the compound indicated in FIG. 1B.

It is desirable that One of the following materials indicated by (XII), (XIII) and (XIV) be used for making the compound.

$R_f$—COOH (XII)

$R_f$—OH (XIII)

$R_f$—$(CH_2)_n$SiX (XIV)

where, $R_f$ is either an alkyl group in which a carbon number is 4 or more, a group including an alkyl group in which fluoride or chloride is substituted for at least one hydrogen thereof, a hydrophobic group in which —$(CF_2)_1$, —$(CH_2)_1$ or — —is included in the molecular chain (where $1 \geqq 4$), m is an integer equal to or greater than 1, and X is either chlorine, methoxy group or ethoxy group.

On the above materials is physically absorbed or chemically connected to the surface of an inorganic material such as gold or copper or an inorganic material such as polyester or polyethylenterephthalate (and preferably the material has a surface energy of approximately 50 dyn/cm or less).

The following are specific examples of the materials in formula (XII), (XIII) and (XV).

$CF_3$—$(CF_2)_5$—COOH $CF_3$—$(CF_2)_7$—COOH $CF_3$—$(CF_2)_7$—$(CH_2)_2$—OH

H—$(CF_2)_{10}$—COOH

H—$(CF_2)_{10}$—$CH_2OH$

F—$(CF_2)_6$—$CH_2CH_2$—$Si(CH_3)_2Cl$ $CF_2Cl(CF_3)CF(CF_2)_5COOH$ $CF_3(CF_2)_7(CH_2)_2SiCl_3$

The compound indicated in FIG. 1C can have a structure where there is only the material of (XII), (XIII) or (XIV).

A description will now be given of the recording medium (A) formed of the above compound.

The configuration of the recording medium (A) is such that it is (1) formed by the previously described surface member itself, or (2) formed by the previously described surface member on a supporting member (preferably a supporting member having heat resistance). The above compound (surface member) which applies to (1) above have either a plate or film shape, or can also be formed as a cylinder. In this case, it is desirable for a film shape to have a film thickness of between 1 μm and 5 μm.

In a case of the compound pertaining to (2) above, it is permitted for the above described compound to permeate some distance into the supporting member. It is desirable that the film thickness of the recording medium (A) itself be from 30 Å to 1 μm. With respect to the thermal conductivity, a film thickness of between 100 Å and 10 μm is better, and with respect to the friction resistance, a film thickness of 10 μm to 1 μm is better. It is desirable that the heat resist temperature of the supporting member be between 50° C. and 300° C.

The shape of the supporting member can also be a belt shape, a plate shape or a drum shape. The shape of the supporting member can be selected in accordance with the usage of an image forming apparatus. In particular, drum shapes have the advantage of being able to ensure good dimensional accuracy. In a case of plate shapes, the size of the plate is determined in accordance with the size of the recording sheet to be used.

Moreover, when a mixture made of the above compound (material formed on the surface of the recording medium (A)) and other material, such as hydrophobic polymer or hydrophobic inorganic material is formed on the supporting member, there is the advantage of preventing dirtying of a background of the image at printing. In addition, in order to raise the thermoconductivity, metal powder or the like can be mixed in the above described compound. Furthermore, in order to increase the adhesiveness between the supporting member and the above described compound, a primer layer can be provided between the supporting member and the compound. The thermal resistance supporting member can be formed of a resin film, such as a polyimide film, a polyester film or the like, a glass, a metal such as Ni, Al, Cu, Cr, Pt or the like, or a metallic oxide. The surface of the supporting member can be smooth, rough or porous.

A description will now be given of the contact material (B).

The contact material (B) has been described above. The contact material (B) is either a liquid or a vapor from its initial state, or a solid which ultimately becomes a liquid at a temperature less than a temperature at which the receding contact angle $\theta_r$ of the recording medium (A) starts to decrease. Then, a liquid obtained by a condensation of the vapor wets the surface of the recording medium (A). At a temperature equal to or less than the temperature at which the receding contact angle $\theta_r$ starts to decrease, the solid changes into a liquid, generates a liquid, or generates a vapor. A liquid is obtained by the condensation of the vapor generated from the solid, and then the liquid wets the surface of the recording medium (A).

The contact material (B) is selected, for example, one of the following material.

In a case of the liquid, the contact material (B) is, in addition to the water, a water soluble liquid including electrolytes, n-butanol and other alcohols, glycerine, ethylene glycol and other multivalent alcohols, a liquid having polarity such as methyl ethyl ketone and other ketones, n-nonan, n-octane and liquids not having polarity such as other chain hydrocarbons, cyclohexane and other circular hydrocarbons, meta-xylene, benzene or other aromatic hydrocarbons. In addition, a substance which is mixture of the above materials is also suitable. Various types of dispersed liquids and liquid inks can also be used. The liquid having polarity are more suitable.

In a case of the vapor, the contact material (B) can be, in addition to the water, a vapor of the above material, particularly ethanol vapor and meta-xylene vapor and other vapors of organic compounds (including those that are mist state) can be used. A temperature of the vapors of organic compounds must be less than a melting point or a softening temperature of the compound which forms the surface of the recording medium.

In a case of the solid, the contact material (B) can be high-class fatty acids, low molecular weight polyethylene, macromolecules gel (poly acryl amido gel, poly vinyl alcohol gel), sillica gel, or hydrated compound.

As will be described later, when the contact material (B) is a "recording agent which contains a colorant" such as the above described liquid inks, the formation of the latent image and the developing of the image are performed simultaneously.

A description will now be given of heating means.

The heating means can be a heater, a thermal head or another type of contact heating device, but can also be a non-contact type of heating device which uses electromagnetic radiation (such as a laser light, infra-red radiation lamps or some of type of light which is irradiated from a light source and focussed through a lens system). In addition, electron beam irradiation or ultraviolet light irradiation can also achieve the process of the present invention if the recording medium (A) can be effectively heated.

Figure 2A:
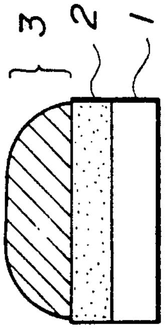
FIGS. 2A, 2B, and 3 are views for describing the fundamental aspects of the image recording process according to the present invention.
Figure 2B:
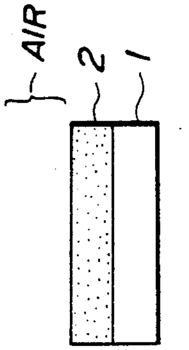

In FIG. 2A, a film 2 of the above described compound is formed on a substrate 1 so as to form the surface of the recording medium (A), and a liquid 3 of the contact material (B) exists on the film 2. In this state, when the film is heated, the receding contact angle $\theta_r$ on the surface of the film 2 decreases so that wetting appears on the surface of the film 2. That is, on the surface of the film, the adhesion of the liquid is recognized. In addition, when the film 2 having the adhesion of the liquid is heated again in a vacuum or in an atmosphere of an inert gas (FIG. 2B), the receding contact angle $\theta_r$ increases and then the water repellency can be recognized on the surface of the film 2.

A phenomena similar to the above phenomena is disclosed in Japanese Patent Publication No. 54-41902, described above. However, this disclosed process differs from the process of the present invention in that the recording material is effectively disordered and in that the mechanism obtains a layer of an amorphas memory substance. That is, in the present invention, it is not possible to have a change in the state of the surface of the recording medium (A) without the contact material (B). In addition, in the process disclosed in Japanese Patent Publication No. 54-41902, it is not possible to obtain the reversible change by a simple operation.

Figure 3A:
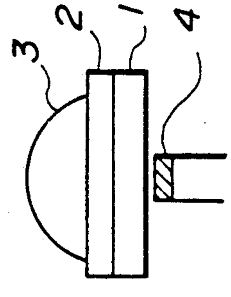

As shown in FIG. 3A, when the film 2 is heated in accordance with a image information signal in a condition in which the liquid 3 is in contact with the surface of the film 2, the adhesion property of the liquid is obtained on a portion, which is heated, of the film 2. In this case, a heater 4 turns on and off in accordance with the image information signal.

Figure 3B:
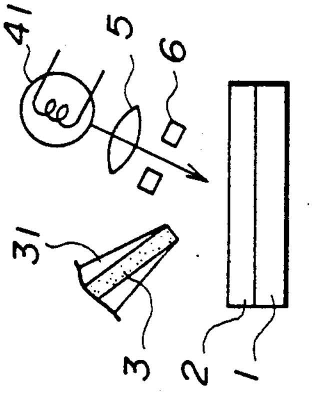
Figure 3C:
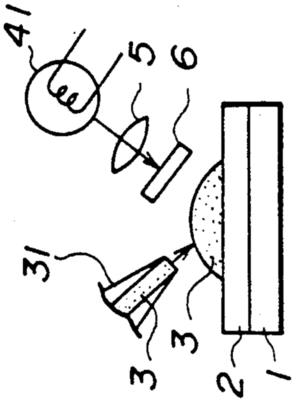

In a case shown in FIGS. 3B and 3C, heat radiation from a infra-red heater 41 is irradiated to the film 2 via a lens 5 and a shutter so that the film 2 is heated in a condition in which there in no liquid thereon, then after the shutter 6 is closed, the liquid 3 is supplied from a liquid supply opening 31 to the film. That is, in this case, after the film 2 is heated, the liquid 3 is provided on the surface of the film 2. The shutter 6 is opened and closed in accordance with the image information.

Figure 4:
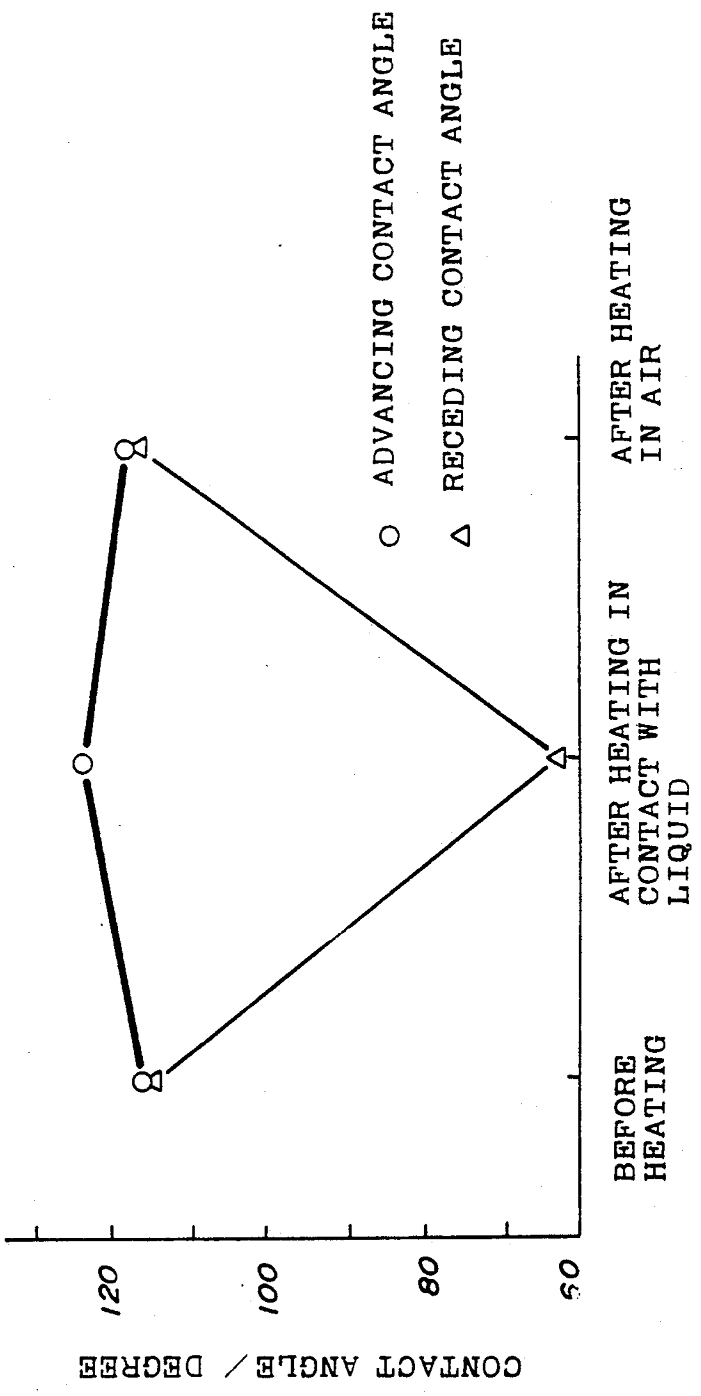
FIG. 4 is a graph indicating the changes in the advancing contract angle and the receding contact angle in the surface of the recording medium.

FIG. 4 is a graph illustrating contact angles of a water-soluble liquid on the film 2 prior to heating the film 2 and after heating film 2 in a condition where the water-soluble liquid is in contact with the film 2. FIG. 4 is also illustrates contact angles of the water-soluble liquid when the film 2 is further heated in air. In FIG. 4, ○ denotes the advancing contact angle, and Δ denotes the receding contact angle.

In general, when the receding contact angle is a high value equal to or greater than 90, the surface of the substance exhibits liquid repellency. When the receding contact angle is a low value less than 90°, the surface of the substance exhibits liquid adhesion.

In a state where the contact material (B) is contact with the recording medium (A), the recording medium (A) should be heated at a temperature between 50° C. and 250° C., but preferably should be heated at a temperature between 80° C. and 150° C. The heating time should be in the range of 0.1 msec to 1 sec., but preferably should be in the range of 0.5 msec to 2 msec. The heating timing is determined as follows. In a case of forming a latent image, ① when the surface of the recording medium (A) is heated, and then the temperature of the recording medium is not less than a predetermined temperature, the contact material (B) is brought into contact with the recording medium (A). ② In a state where the contact material (B) is in contact with the surface of the recording medium (A) (the liquid is in contact with the surface of the recording medium), the surface of the recording medium (A) is heated. Either the above ① or ② can be carried out. In a case of erasing the latent image, the recording medium (A) should be heated at a temperature between 50° C. and 300° C., but preferably should be heated at a temperature between 100° C. and 180° C. The heating time should be in a range of 1 msec. to 10 sec, but preferably should be in a range of 10 msec. to 1 sec.

A detailed description will now be given of means for recording image information on the surface of the recording medium (A).

Figure 5A:
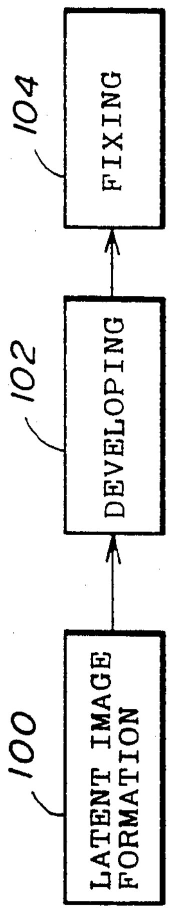
FIGS. 5A, 5B and 5C are block diagrams illustrating recording processes according to the present invention.

As shown in FIG. 5A, the surface of the recording medium (A) is heated in accordance with a image information signal in a condition where a liquid is provided on the surface of the recording medium (A) or in a vapor atmosphere, and thus liquid adhesion areas are formed on the surface cf the recording medium (A) (latent image formation step 100). After this, a recording agent which is melted solid ink is brought into contact with the surface of the recording medium (A) so that the solid ink adheres to the latent image portion (developing step 102). Then, the image formed by the solid ink is fixed on the surface of the recording medium (A) (fixing step 104). The above process for recording the image is often referred to as a direct recording process.

Figure 5B:
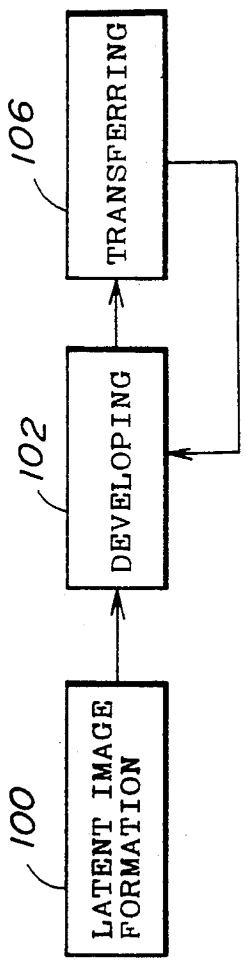
Figure 5C:
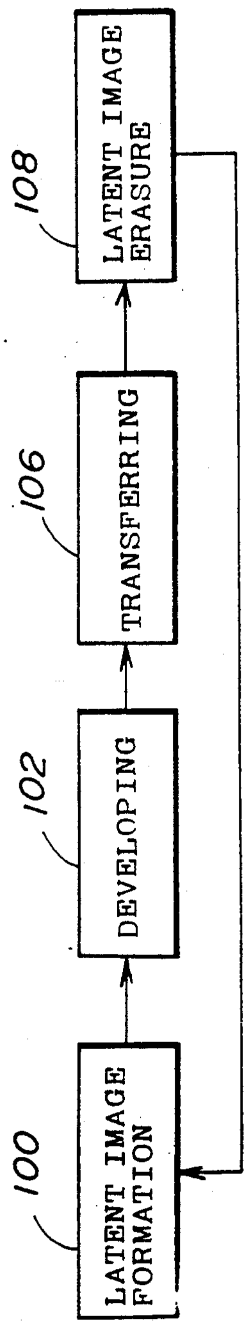

As shown in FIG. 5B, the surface of the recording medium (A) is heated in accordance with the image information signal in the condition where the liquid is contact with the surface of the recording medium (A) or in the vapor atmosphere, and thus liquid adhesion areas are formed on the surface of the recording medium (A) (latent image formation step 100). After this, the solid ink is brought into contact with the surface of the recording medium (A) so that the solid ink adheres to the latent image portion (developing step 102). Then, the image formed by the solid ink is transferred to a recording sheet (transferring step 106). This process for recording image on the recording sheet is often referred to as an indirect recording process. Furthermore, if the step where the solid ink is brought into with the latent image portion on the surface of the recording medium (A) and the step where the image formed by the solid ink is transferred to the recording sheet are sequentially repeatedly carried out, the images are successively formed on the recording sheets. That is, a printing process in which the recording medium (A) is used as a printing plate is obtained.

As shown in FIG. C after the latent image formation step 100, the developing step 102 and the transferring step 106 are sequentially carried out, the surface of the recording medium (A) is heated without the liquid or the vapor so that the latent image is erased from the surface of the recording medium (A). That is, an image forming process in which it is possible to repeatedly form different latent image on the surface of the recording medium (A). This process for repeatedly forming the image on the recording medium (A) is referred to as a repeat recording process.

The solid ink is defined as ink whose softening temperature is greater than a room temperature and less than a temperature at which the receding contact angle on the recording medium starts to decrease when the recording medium is heated with the liquid. That is, the softening temperature of the solid ink must be less than a temperature T shown in FIG. 6. When the recording medium (A) is heated at approximately a temperature T, the receding contact angle starts greatly decreasing. If the softening temperature of the solid ink is greater than the temperature T, it is impossible to maintained fluidity of the solid ink under a condition in which the receding contact angle of the surface of the recording medium (a) is not decreased.

A description will now be given of an apparatus for recording an image in accordance with the above described process.

If the recording medium (A) has the surface on which the receding contact angle decreases when the liquid is brought into contact with the surface and the surface is heated, the recording medium (A) can have any shape. The surface having the above characteristic will be hereinafter termed the "film 2" or the "surface of the recording medium (A)". The recording medium (A) can be either a rigid cylindrical shape or a flexible film shape.

In a case where the substrate of the recording medium (A) is formed of resin, as the substrate has a poor heat conductivity, a time required for heating the surface of the recording medium is heated and obtaining the adhesive of the liquid is relatively long. Therefore, a good heat conductor is used for either all or a part of the substrate.

Figure 6:
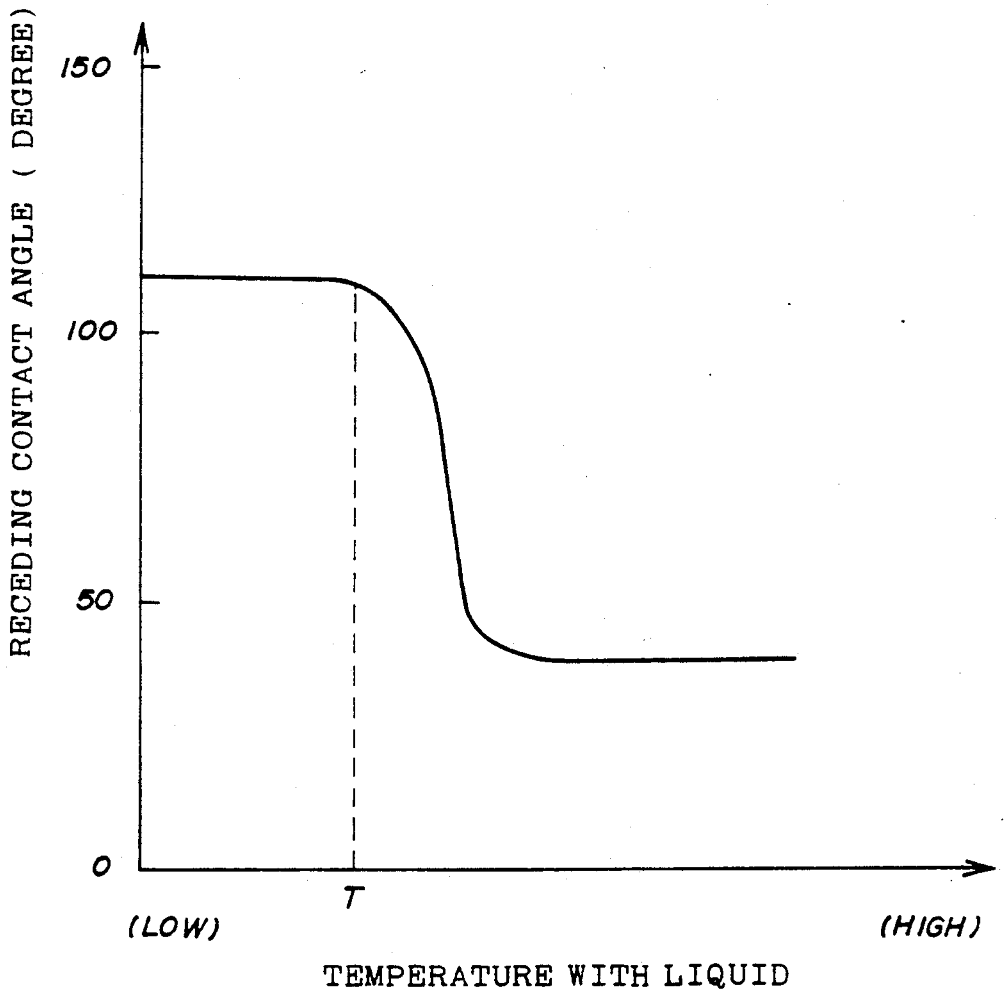
FIG. 6 is a graph illustrating a relationship between a temperature of the recording medium which is heated with the liquid and the receding contact angle thereon.
Figure 7B:
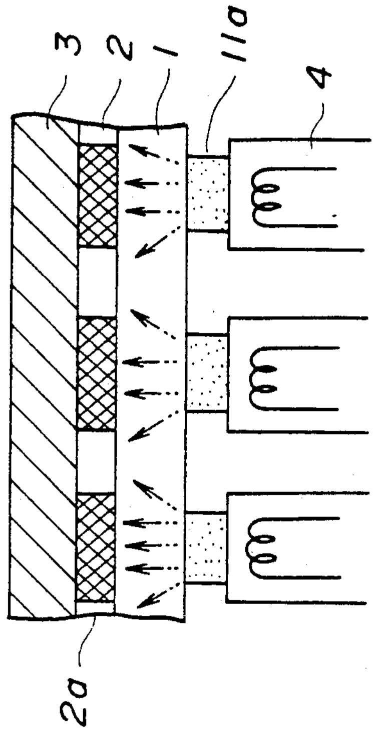
FIGS. 7A & 7B are views illustrating examples of a mechanism for heating the recording medium.
Figure 7A:
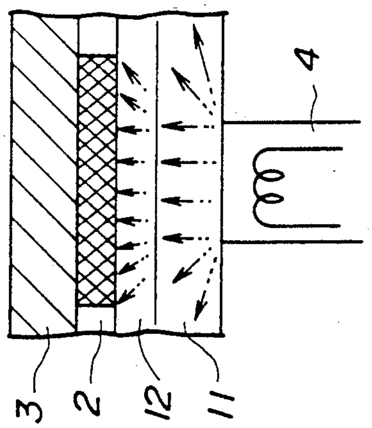

In FIG. 7A, a good heat conductor such as a metal is used as the substrate (metal substrate 11). An organic thin film 12 is formed on the metal substrate 11 by vapor evaporation, and the film 2 is formed on the organic thin film 12. Due to this stacked structure, it is possible to improve a speed of thermal conductivity in the vertical direction. The organic thin film 12 is, for example, made of polyimide, polyester, phtalocyanine or the like. This structure is thought to be sufficient in a case where the printing dots are relatively large. However, this mechanism shown in FIG. 7A is not suitable for rapidly printing a dot image since an area having liquid adhesive enlarges by the dispersion of the heat, supplied from the heater 4, in directions parallel to the surface of the film 2. A structure shown in FIG. 7B prevents the heat provided from each heater 4 from dispersing in the directions parallel to the surface of the film 2, so that each area **2*a* having liquid adhesive can be minimized. In FIG. 6B, small metal films 11*a* are formed on a surface of the substrate, which surface is opposite to a surface on which the film 2 is formed. The heat generated by each heater 4 is transmitted via each corresponding metal film 11*a* and the substrate 1 to the film 2**.

As has been described above, the heater source can be a heater, a thermal head or some other types of contact heaters, or a laser light, an infra-red lamp or some other types of non-contact heaters which emit an electromagnetic wave. The solid ink is used as the recording agent.

Figure 8:
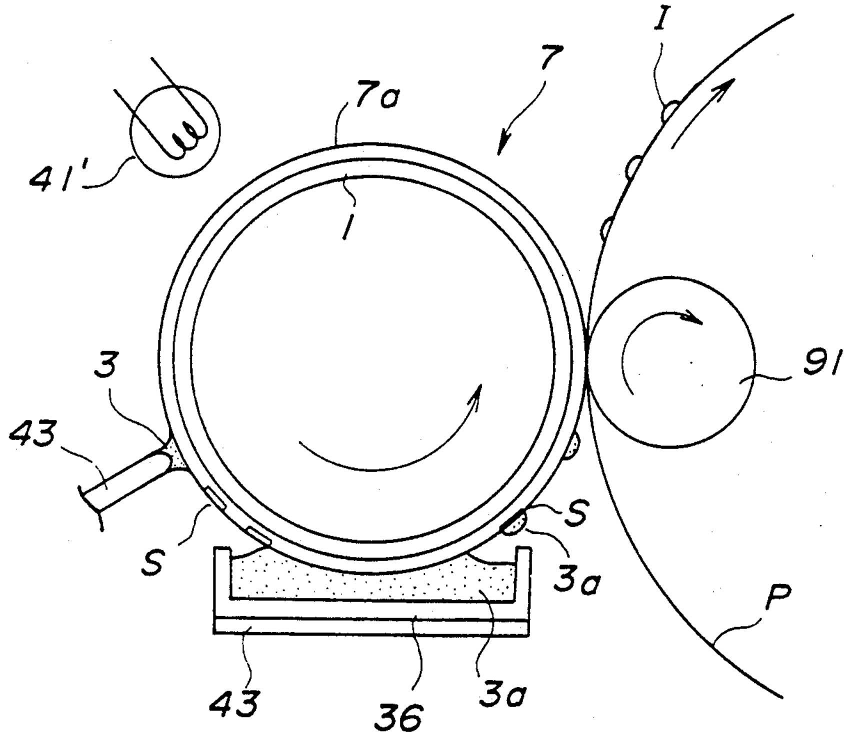
FIG. 8 is a diagram illustrating a first embodiment of the apparatus for forming an image.

FIG. 8 shows a first embodiment of the apparatus for recording an image. Referring to FIG. 8, a recording medium 7 is formed of a cylindrical substrate 1 and a film *7a* which is coated on the substrate 1. The film *7a* has the characteristic in which the receding contact angle decreases when the film *7a* is heated under a condition in which the liquid is in contact with the film *7a*. The solid ink **3*a* is filled in a vat 36. A sheet-shaped heater 43 is adhered to a bottom surface of the vat 36. The solid ink 3*a* is heated by the sheet-shaped heater 43 so as to be maintained in liquid in the vat 36. In a state where the lower surface of the recording medium 7 is in contact with the solid ink 3*a* in the vat 36, the recording medium 7 is rotated at a constant speed, for example, in a counterclockwise direction shown by an arrow in FIG. 8. A thermal head 42 is provided at an upper stream side of the vat 36 so that an end of the thermal head 42** is close to the surface of the film *7a*. A liquid 3 such as water is supplied between the surface of the film *7a* and the end of the thermal head 42, so that the thermal head 42 selectively heats the surface of the film *7a* with the liquid 3 in accordance with the image information. A recording sheet P is supplied between the recording medium 7 and a transfer roller 91. The recording sheet P is fed by rotations of the recording medium 7 and the transfer roller 91. An infra-red lamp 41' is provided at an upper stream side of the thermal head 42 so as to heat the surface of the film *7a* without the liquid.

In the apparatus having the above structure, a visible image is formed on the recording sheet P in the following manner.

When the thermal head 42 selectively heats the surface of the film *7a* with the liquid 3 in accordance with the image information, latent images corresponding to the image information are formed on the surface of the film *7a*. Each latent image S is a liquid adhesion area on which the receding contact angle is decreased. Then, when each latent image S passes in the solid ink **3*a* being melt in the vat 36, the solid ink 3*a*** is adhered to each latent image S (the liquid adhesive area). That is, the latent images formed on the film *7a* are developed. After this, while the solid ink **3*a* is soft, the solid ink 3*a* is transferred from the recording medium 7 to the recording sheet P by the transfer roller 91**. The solid ink *3a* transferred to the recording sheet P is set thereon so that the visible image I is formed on the recording sheet P. After the solid ink 3*a* is transferred to the recording sheet P, the latent image remaining on the recording medium 7 is disappeared by heating the recording medium 7 without the liquid by the infra-red lamp 41′

The solid ink 3*a* has a melting point within a range of 30°–200° C., and the melting point of the solid ink 3*a* is less than the temperature T shown in FIG. 6. The solid ink 3*a* is mainly formed of a dye or a pigment and a binder.

The water-soluble dye can be a dye which is classified by the color index into acid dyes, direct dyes, basic dyes, and reactive dyes. The examples of dyes are indicated as follows.

C.I. acid yellow: 17, 23, 42, 44,79, 142
C.I. acid red: 1, 8, 13, 14, 18, 26, 27, 35, 37, 42, 52, 82, 87, 89, 92, 97, 106, 111, 114, 115, 134, 186, 249, 254, 289
C.I. acid blue: 9, 29, 45, 92, 249, 890
C.I. acid black: 1, 2, 7, 24, 26, 94
C.I. food yellow: 3, 4
C.I. food red: 7, 9, 14
C.I. food black: 2
C.I. direct yellow: 1, 12, 24, 26, 33, 44, 50, 142, 144, 865
C.I. direct red: 1, 4, 9, 13, 17, 20, 28, 31, 39, 80, 81, 83, 89, 225, 227
C.I. direct orange: 26, 29. 62, 102
C.I. direct blue: 1, 2, 6, 15, 22, 25, 71, 76, 79, 86, 87, 90, 98, 163, 165, 202
C.I. direct black: 19, 22, 32, 38, 51, 56, 71, 74, 75, 77, 154, 168
C.I. basic yellow: 1, 2, 11, 14, 15, 19, 21, 23, 24, 25, 28, 29, 32, 36, 40, 41, 45, 49, 51, 53, 63, 65, 67, 70, 73, 77, 87, 91
C.I. basic red: 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112
C.I. basic blue: 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155
C.I. basic black: 2, 8

The pigment can be organic pigment such as azo pigment, phtalocyanine pigment, anthraquinone pigment, quinacridon pigment, diexazine pigment, indigo pigment, dioindigo pigment, perynone pigment, perylene pigment, iso-indolenone pigment, aniline black, azomethine azo pigment, carbon block and others. The inorganic pigment can be iron oxide, titanium oxide, calcium carbonate, baruim sulfate, ammonium hydroxide, barium yellow, prussian blue, cadmium red, chrome yellow and metal powder.

The dispersed pigment compounds can be polyacrylamide, polyacryrate and other alkali metallic salt, soluble styrene arcylic resin and their acryl family resin, soluble vinyl napthalene acid resin, polyvinyl pyrrolidone, polyvinyl alcohol, and its alkali salt, macromolecule compound which includes salt with cation functional group such as ammonium and amino group etc., polyethylene oxide, gelatine, casein and other proteins, arabia rubber, traganth rubber and other natural rubber, saponin and other qlucoxyde, carboxy-methyl cellulose, hydroxyethyl cellulose, methyl cellulose and other cellulose inductors, lignin sulfonic acid and its salt, ceramics and other natural macromolecule compounds, and the like.

Representative examples of the oil-based type dyes are indicated as follows:

C.I. solvent yellow: 1, 2, 3, 4, 5, 6, 7, 8, 9, 10, 11, 12, 14, 16, 17, 26, 27, 29, 30, 39, 40, 46, 49, 50, 51, 56, 61, 80, 86, 87, 89, 96
C.I. solvent orange: 12, 23, 31, 43, 51, 61
C.I. solvent red: 1, 2, 3, 16, 17, 18, 19, 20, 22, 24, 25, 26, 40, 52, 59, 60, 63, 67, 68, 121
C.I. solvent violet: 7, 16, 17,
C.I. solvent blue: 2, 6, 11, 15, 20, 30, 31, 32, 35, 36, 55, 58, 71, 72
C.I. solvent brown: 2, 10, 15, 21, 22
C.I. solvent black: 3, 10, 11, 12, 13.

The binder can be polyacrylic acid ester, polyethylene oxide, ethylene vinyl acetate copolymer, natural was such as carnauba wax, candelilla wax, spemaceti, bees was, Japan wax, and jojoba wax, higher alcohol such as tetracosanol and hexacosanol, and ester thereof, higher fatty acid and ester thereof. A melting point of each of above material is in a range of 3020 –200° C.

The viscosity of the solid ink 3*a* in the vat 36 is controlled by heat of the sheet-shaped heater 43. That is, when this apparatus is operated, the sheet-shaped heater 43 is turned on so that the solid ink 3*a* is maintained at a viscosity in which the solid ink 3*a* can be in liquid, and when this apparatus in not operated, the sheet-shaped heater 43 is turned off so that the solid ink 3*a* is in solid.

Figure 9A:
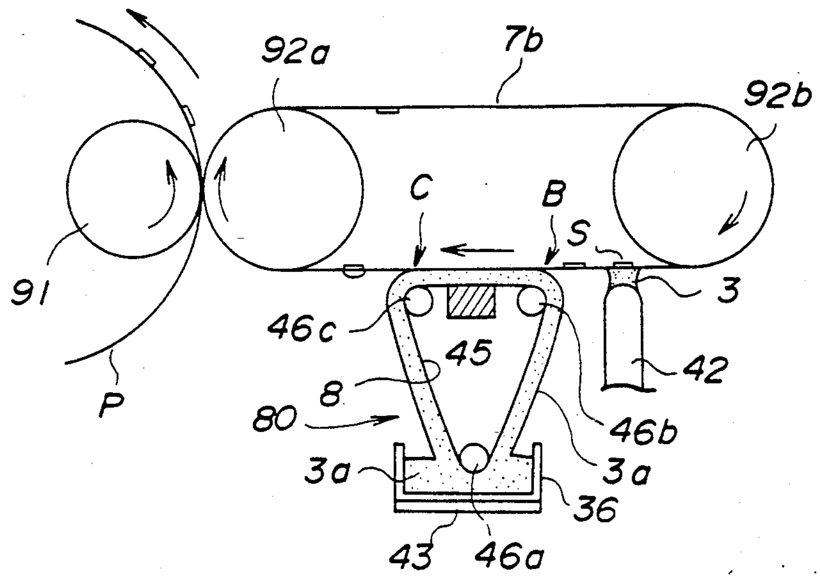
FIG. 9A is a diagram illustrating a second embodiment of the apparatus for forming an image.
Figure 9B:
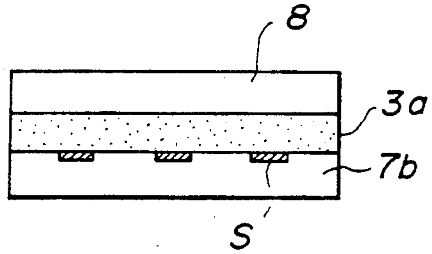
FIG. 9B is a sectional view illustrating the solid ink sandwiched between a supporting belt and the recording medium in the apparatus shown in FIG. 9A.

FIG. 9A shows a second embodiment of the apparatus for recording an image. Referring to FIG. 9, a belt-shaped recording medium 7*b* is wound between a first feed roller 92*a* and a second feed roller 92*b*. When both the first and second feed rollers 92*a* and 92*b* are respectively rotated in a clockwise direction, the recording medium 7*b* is rotated around both the first and second feed rollers 92*a* and 92*b* in the clockwise direction, as shown by an arrow in FIG. 9A. An ink supply unit 80 is provided close to the surface of the recording medium 7*b*. The ink supply unit 80 has a vat 36 which is filled with the solid ink 3*a*, rollers 46*a*, 46*b* and 46*c* and a supporting belt 8 which is wound around the rollers 46*a*, 46*b* and 46*c*. The roller 46*a* is provided in the vat 36, and the rollers 46*b* and 46*c* are arranged in a line parallel to the recording medium 7*b*. The supporting belt 8 is moves at the same speed as the recording medium 7*b* in a direction parallel to the recording medium 7*b* from a point B at which the roller 46*b* is placed to a point C at which the roller 46*c* is placed. A sheet-shaped heater 43 is adhered to the bottom surface of the vat 36, in the same manner as that in the first embodiment shown in FIG. 8. The sheet-shaped heater 43 heats the solid ink 3*a* so that the solid ink 3*a* is melted and maintained in liquid. The solid ink 3*a* is supplied from the vat 36 to the surface of the supporting belt 8, so that the supporting belt 8 is moved in a state where the solid ink 3*a* is maintained at the surface of the supporting belt 8. A thermal head 42 is provided at the upper steam side of the ink supply unit 80 so that an end of the thermal head 42 is close to the surface of the recording medium 7*b*. A liquid 3 is supplied between the end of the thermal head 42 and the surface of the recording medium 7*b* so that the surface of the recording medium 7*b* is selectively heated with the liquid 3 by the thermal head 42. The solid ink 3*a* maintained on the surface of supporting belt 8 is in contact with the surface of the recording medium 7*b* in a path between the point B and the point C. A cooling block 45 is provided at a predetermined position in the path between the point B and the point C so as to be in contact with the supporting belt 8. The cooling block 45 is formed of a material having a large thermal conductivity, such as a metal of Al, Ni or the like.

The thermal conductivity of the cooling block 45 is preferably in a range of 0.01–1 [cal/cm sec ° c].

Figure 9C:
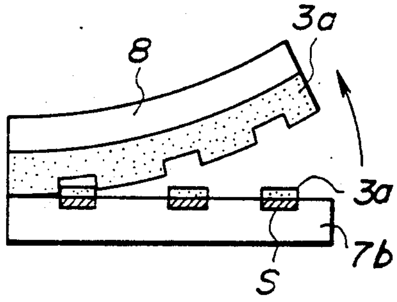
FIG. 9C is a sectional view illustrating a state in which the supporting belt and the recording medium are separated from each other in the apparatus shown in FIG. 9A.

The thermal head 42 selectively heats the surface of the recording medium *7b* with the liquid 3, so that the latent image S (the liquid adhesion area) is formed on the recording medium *7b*, in the same manner as the first embodiment shown in FIG. 8. The solid ink *3a* being melted maintained on the supporting belt 8 is adhered to the latent image S at the point B. Then the solid ink *3a* is moved through the path from the point B to the point C in a state where the solid ink *3a* is sandwiched between the recording medium *7b* and the supporting belt 8. While the solid ink *3a* is moving from the point B to the point C, the solid ink *3b* is cooled by the cooling block 45. As a result, the solid ink *3b* is set between the recording medium *7b* and the supporting belt 8 before reaching the point C, as shown in FIG. 9C. In this case, as the receding contact angle of the liquid adhesion area (the latent image S) is less than that of another area, adhesion generated between the solid ink *3a* and the liquid adhesion area is greater than adhesion generated between the solid ink *3a* and another area. In addition, adhesion generated between the solid ink *3a* and the another area is less than adhesion generated between the solid ink *3a* and the supporting belt 8. Furthermore, adhesion generated between the solid ink *3a* and the supporting belt 8 is less than adhesion generated between the solid ink *3a* and the liquid adhesion area. Thus, when the recording medium *7b* and the supporting belt 8 are separated from each other at the point C as shown in FIG. 9C, a part of solid ink *3a* which is in contact with each liquid adhesion area (the latent image S) is separated from the solid ink *3a* maintained on the supporting belt 8 and adhered to each liquid adhesion area. Another part of the solid ink *3a* remains on the supporting belt 8. Due to the above process, the latent image S is developed by the solid ink *3a*. The solid ink *3a* adhered to each liquid adhesive area is transferred to the recording sheet P by the transfer roller 91, so that the visible image is formed on the recording sheet P.

A cooling device using a Peltier element can be substituted for the cooling block 45. If the length between the point B and the point C and the speed of the supporting belt 8 are respectively set at suitable values, the solid ink *3a* can be naturally cooled so as to be set before reaching the point C.

Figure 10:
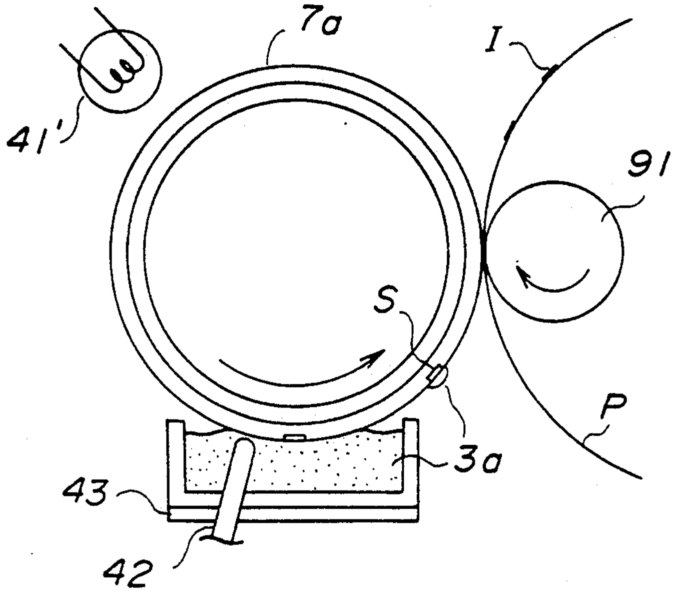
FIG. 10 is a diagram illustrating a third embodiment of the apparatus for forming an image.

FIG. 10 shows a third embodiment of the apparatus for recording an image. In this apparatus, the film *7a* of the recording medium 7 is selectively heated by the thermal head 42 in accordance with the image information in a condition in which the solid ink *3a* being melted in the vat 36 is in a contact with the surface of the film *7a*. Thus, a process for forming a latent image and a process for developing the latent image are carried out at the same time. In the third embodiment, the solid ink *3a* being melted not only functions as the recording agent but also as the contact material (B).

Figure 11:
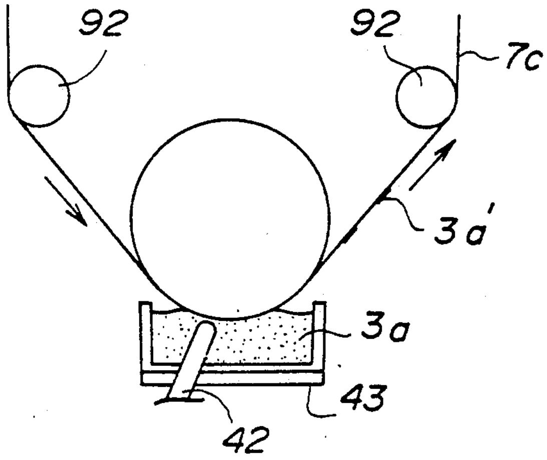
FIG. 11 is a diagram illustrating a fourth embodiment of the apparatus for forming an image.

FIG. 11 shows a fourth embodiment of the apparatus for recording an image. In this apparatus, the compound used for forming the above film 2 is coated on or impregnated into a base sheet such as paper or cloth, so that a sheet-shaped recording medium *7c* is formed. The recording medium *7c* is heated by the thermal head 42 in a condition in which the solid ink *3a* being melted in the vat is in contact with the surface of the recording medium *7c*, in the same manner as that in the third embodiment shown in FIG. 10. The visible image is directly formed by the solid ink *3a* on the sheet-shaped recording medium *7c*.

Figure 12:
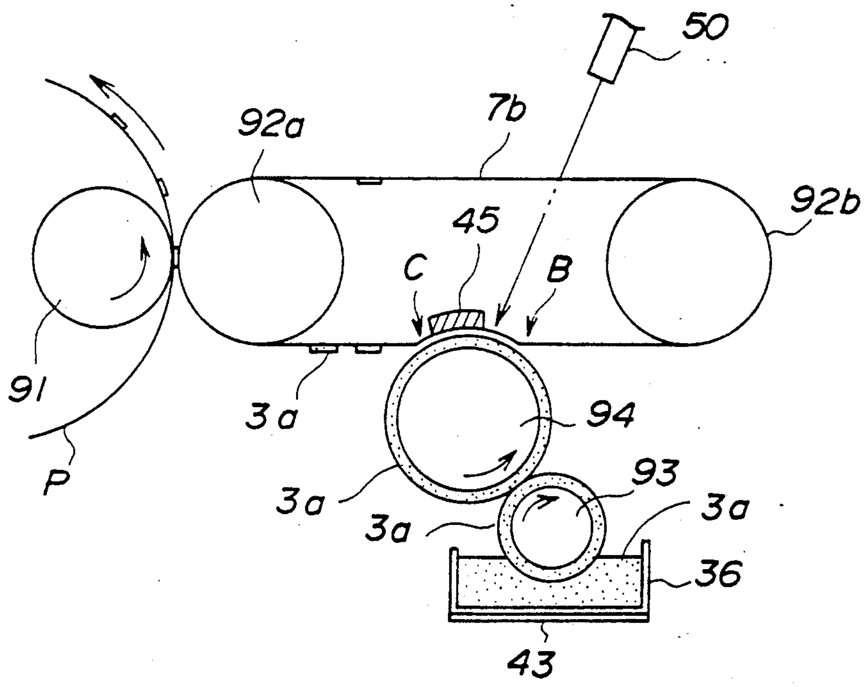
FIG. 12 is a diagram illustrating a fifth embodiment of the apparatus for forming, an image.

FIG. 12 shows a fifth embodiment of the apparatus for recording an image. In FIG. 12, those parts which are the same as those shown in FIG. 9A are given the same reference numbers. In the fifth embodiment, the solid ink *3a* being melted not only functions as the recording agent but also the contact medium (B), in the same manner as the above third and fourth embodiment shown in FIGS. 10 and 11.

Referring to FIG. 12, a part of a first roller 93 is dipped into the solid ink *3a* being melted in the vat 36 so that the solid ink *3a* is transferred to the surface of the first roller 93. The solid ink *3a* is uniformly maintained on the surface of the first roller 93 in a liquid state. The first roller 93 is rotated at a constant speed in a clockwise direction. A second roller 94 is provided between the first roller 93 and a belt-shaped recording medium *7b* which is rotated in a clockwise direction by the feed rollers *92a* and *92b*. The second roller 94 is pressed against the recording medium *7b* so that a recording part of the recording medium *7b* is curved, the recording part being in contact with the second roller 94. The second roller 94 is in contact with the first roller 93, so that the solid ink *3a* is transferred from the surface of the first roller 93 to the surface of the second roller 94. As the first roller 93 is rotated in the clockwise direction, the second roller 94 is rotated at a constant speed in a counterclockwise direction. The peripheral speed of the second roller 94 is equal to the speed at which the recording medium *7b* moves. The solid ink *3a* transferred to the surface of the second roller 94 is set before reaching the point B corresponding to a first end of the above recording part. A laser unit 50 emits a laser beam modulated in accordance with the image information. The laser beam from the laser unit 50 is projected onto the recording part of the recording medium *7b*. A cooling block 45 is placed between a position onto which the laser beam is projected and the point C corresponding to a second end of the above recording part of the recording medium *7b*. The cooling block 45 is in contact with the surface of the recording medium *7b*.

When the laser beam is projected onto the surface of the recording medium *7b*, the solid ink *3b* is heated by heat transmitted via the recording medium being heated so that the solid ink *3b* is melted. As a result, the recording medium *7b* is heated by the laser beam under a condition in which the solid ink *3b* be melted (the liquid) is in contact with the recording medium *7b*, so that the liquid adhesion area (the latent image) is formed on the recording medium *7b*. At the same time, the solid ink *3a* is adhered to the liquid adhesion area on the recording medium *7b*. That is, a process for forming a latent image and a process for developing the latent image are carried out at the same time, in the same manner as the case shown in FIGS. 10 and 11. Then the solid ink *3a* is sandwiched between the recording medium *7b* and the second roller 94 as shown in FIG. *9b* and moved toward the point C with being cooled by the cooling block 45. The solid ink *3a* is completely set before reaching the point C. At the point C, a part of the solid ink *3a* on the liquid adhesive area (the latent image) formed on the recording medium *7b* is separated from the other part of the solid ink *3a* on the second roller, as shown in FIG. 9C.

Figure 13A:
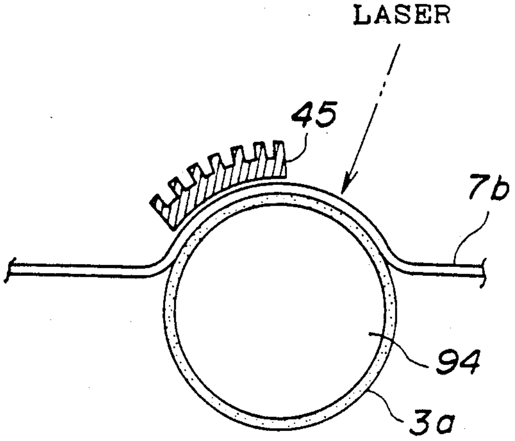
FIGS. 13A through 13C are diagrams illustrating examples of means for cooling the solid ink on the recording medium.
Figure 13B:
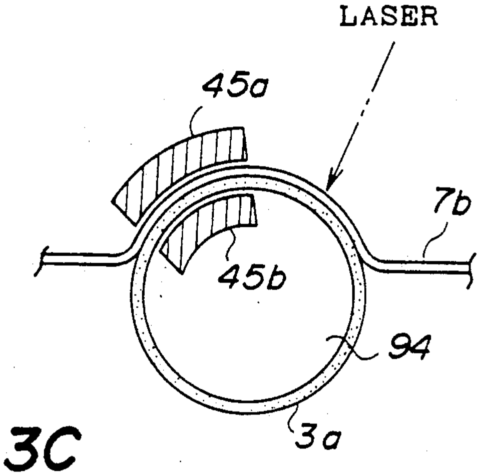
Figure 13C:
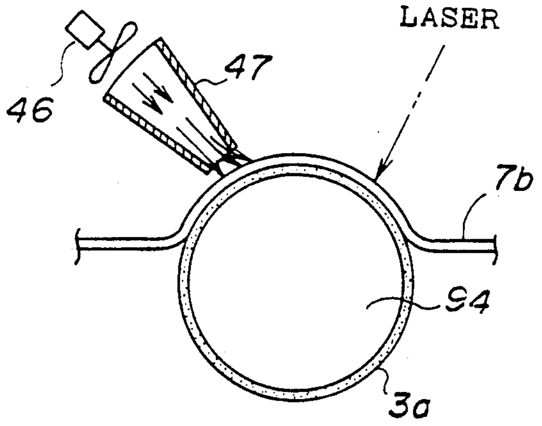

The cooling block 45 used in the second and fifth embodiments shown in FIGS. 9A and 12 can have fins formed on the surface thereof, as shown in FIG. 13A. A plurality of cooling blocks can be provided to the ink supplying unit, as shown in FIG. 13B. In FIG. 13B, a first cooling block 45a is in contact with the recording medium 7b and a second cooling block 45b is in contact with an inner surface of the second roller 94. In addition, the solid ink 3a adhered to the recording medium 7b can be cooled by wind, as shown in FIG. 13C. In FIG. 13C, the wind generated by a fun 46 passes through a guide pipe 47 and supplied to the surface of the recording medium to which the solid ink 3a is adhered.

EXAMPLES

Example 1

The image was formed by the apparatus shown in FIG. 8. The thermal head 42 had thermal elements which were arranged in a line at a rate of 8 dot/mm, each element having an area of 200×100 μm. The liquid used for forming the latent image was demineralized water. A substrate formed of polyimide was coated with a polymer of a material formed of acrylate including fluorine (17F manufactured by OSAKA ORGANIC CHEMICAL CO., LTD.), so that the recording medium was formed. A temperature of the recording medium corresponding to the temperature T shown in FIG. 6 was approximately 80° C. A main component of the solid ink was paraffin wax (SP-0110 Nippon Siro Co., Ltd.). Black dye was dissolved in the paraffin wax, so that the solid ink was made. A melting point of the solid ink was approximately 44° C. The solid ink was heated at approximately 50° C. by the heater so that the solid ink was maintained in liquid.

An image was formed on the recording sheet under the above condition. As a result, a clear image was obtained on the recording sheet and the quality of the image was maintained for a long time.

Example 2

An image was formed by the apparatus shown in FIG. 9. A process for forming a latent image and a process for transferring the image to the recording medium was respectively performed in the same manner as those in Example 1. The thermal head had thermal elements which were arranged in a line at a rate of 8 dot/mm, each thermal element having an area of 200×100 μm. The liquid used for forming the latent image was demineralized water. A substrate formed of polyimide was coated with a polymer of a material formed of acrylate including fluorine (17F manufactured by OSAKA ORGANIC CHEMICAL CO., LTD.), so that the recording medium was formed. A temperature of the recording medium corresponding to the temperature T shown in FIG. 6 was approximately 80° C. The solid ink maintained at 50° C. was supplied to the supporting belt 8 and sandwiched between the recording medium and the supporting belt 8 in the path B - C. The solid ink was naturally cooled between the point B and the point C and then the supporting belt 8 was separated from the recording medium at the point C.

An image was formed under the above condition, so that a clear image was obtained.

Example 3

An image was formed by the apparatus shown in FIG. 10. In this case, the liquid used for forming an latent image was the melted solid ink. The thermal head had thermal elements which were arranged in a line at a rate of 8 dot/mm, each thermal element having an area of 200×100 μm. A substrate formed of polyimide was coated with a polymer of a material formed of acrylate including fluorine (17F manufactured by OSAKA ORGANIC CHEMICAL CO., LTD.), so that the recording medium was formed. A temperature of the recording medium corresponding to the temperature T shown in FIG. 6 was approximately 80° C. A main component of the solid ink was paraffin wax (SP-0110 Nippon Siro Co., Ltd.). Black dye was dissolved in the paraffin wax, so that the solid ink was made.

An image was formed on the recording sheet under the above condition. As a result, a clear image was obtained on the recording sheet. In this case, as a mechanism for forming a latent image is simple, the apparatus can be miniaturized.

EXAMPLE 4

An image was formed by the apparatus shown in FIG. 11. In this case, a component of the film 2 was impregnated in the base sheet so that the recording medium was formed. Thus, the visible image was directly formed on the recording medium. The liquid used for forming a latent image was the melted solid ink, in the same manner as that in Example 3. The thermal head had thermal elements which were arranged in a line at a rate of 8 dot/mm, each thermal element having an area 200×100 μm. A substrate formed of polyimide was coated with a polymer of a material formed of acrylate including fluorine (17F manufactured by OSAKA ORGANIC CHEMICAL CO., LTD.), so that the recording medium was formed. A main component of the solid ink was paraffin wax (SP-0110 Nippon Siro Co., Ltd.). Black dye was dissolved in the paraffin wax, so that the solid ink was made.

An image was formed under the above condition. As a result, a clear image was obtained on the recording medium. In this case, as a process for transferring the solid ink from the recording medium to the recording sheet does not need, the apparatus can be miniaturized.

Example 5

An image was formed by the apparatus shown in FIG. 12. The thermal head had thermal elements which were arranged in a line at a rate of 8 dot/mm, each thermal element having an area 200×100 μm. A substrate formed of polyimide was coated with a polymer of a material formed of acrylate including fluorine (17F manufactured by OSAKA ORGANIC CHEMICAL CO., LTD.), so that the recording medium was formed. A temperature of the recording medium corresponding to the temperature T shown in FIG. 6 was approximately 80° C. A main component of the solid ink was paraffin wax (SP-0110 Nippon Siro Co., Ltd.). Black dye was dissolved in the paraffin wax, so that the solid ink was made.

An image was formed on the recording medium under the above condition. As a result, a clear image was obtained on the recording medium. In this case, as a mechanism for forming a latent image is simple, the apparatus can be miniaturized.

The present invention is not limited to the aforementioned embodiments, and variations and modifications may be made without departing from the scope of the claimed invention.

What is claimed is:

1. A process for forming an image on a recording medium, a surface of said recording medium having a characteristic in which a receding contact angle decreases when said recording medium is heated under a condition in which a liquid is in contact with the surface of said recording medium, said process comprising the following steps (a) through (c) of:

(a) bringing a contact material into contact with the surface of said recording medium, said contact material being selected from a liquid, vapor and a solid which generates or changes to either a vapor or a liquid under a condition of a temperature lower than a temperature at which the receding contact angle on the surface of the recording medium starts to decrease;

(b) selectively heating the surface of said recording medium in accordance with image information, whereby an adhesion area having the receding contact angle whose value corresponds to a temperature on the surface of said recording medium heated by said step (b) is formed, as a latent image, on the surface of said recording medium; and (c) adhering a solid ink to the adhesion area so that the latent image formed on said recording medium is developed, said solid ink being defined as an ink whose softening temperature is higher than a room temperature and lower than a temperature at which the receding contact angle on the surface of said recording medium starts to decrease.

2. A process as claimed in claim 1, wherein said step (a) precedes said step (b).

3. A process as claimed in claim 1, wherein said step (b) precedes said step (a).

4. A process as claimed in claim 1, wherein said step (c) comprises steps of:

heating the solid ink so that the solid ink is melted and maintained in liquid; and supplying the solid ink which is melted to the adhesion area formed on said recording medium, wherein said solid ink adhered to the adhesion area is normally coold.

5. A process as claimed in claim 1, wherein said step (c) comprises steps of:

heating the solid ink so that the solid ink is melted and maintained in liquid;

supplying the solid ink which is melted to the surface of said recording medium;

cooling the solid ink supplied to the surface of said recording medium so that the solid ink is set on the surface of the recording medium; and separating a part of the solid ink which covers an area other than the adhesion area from the surface of said recording medium, so that the solid ink remains on the adhesion area.

6. A process as claimed in claim 1 further comprising a step (d) of transferring the solid ink adhered to the adhesion area formed on the surface of said recording medium to a recording sheet.

7. A process as claimed in claim 6 further comprising a step (e) of heating the surface of said recording medium under a condition where there is no liquid after said step (d), whereby the receding contact angle on the adhesive area returns to an original value so that the latent image is disappeared from the surface of the recording medium.

8. A process for forming an image on a recording medium, a surface of said recording medium having a characteristic in which a receding contact angle decreases when said recording medium is heated under a condition in which a liquid is in contact with the surface of said recording medium, said process comprising the following steps (a) and (b) of:

(a) bringing a solid ink which is melted into contact with the surface of said recording medium, said solid ink being defined as an ink whose softening temperature is higher than a room temperature and lower than a temperature at which the receding contact angle on the surface of said recording medium starts to decrease; and (b) selectively heating the surface of said recording medium in accordance with image information, wherein the solid ink is adhered to an adhesion area which is formed on the surface of said recording medium when the surface of said recording medium is heated under a condition in which the solid ink which is melted is in contact with the surface of said recording medium, the adhesion area having the receding contact angle whose value corresponds to a temperature on the surface of said recording medium heated by said step (b), so that a visible image of the solid ink is formed on the surface of said recording medium.

9. A process as claimed in claim 8, wherein said step (a) precedes said step (b).

10. A process as claimed in claim 8, wherein said step (b) precedes said step (a).

11. A process as claimed in claim 8, wherein said step (a) comprises steps of:

heating the solid ink so that the solid ink is melted and maintained in liquid; and supplying the solid ink which is melted to the surface of said recording medium.

12. A process as claimed in claim 11 further comprising a steps (c) and (d) of:

(c) cooling the solid ink supplied to the surface of said recording medium so that the solid ink is set on the surface of the recording medium; and (d) separating a part of the solid ink which covers an area other than the adhesion area from the surface of said recording medium, so that the solid ink remains on the adhesion area.

13. A process as claimed in claim 8 further comprising a step (e) of transferring the solid ink adhered to the adhesion area formed on the surface of said recording medium to a recording sheet.

14. A process as claimed in claim 13 further comprising a step (f) of heating the surface of said recording medium under a condition where there is no liquid after said step (e), whereby the receding contact angle on the adhesive area returns to an original value.

15. An apparatus for forming an image comprising:

a recording medium which has a surface having a characteristic in which a receding contact angle decreases when said recording medium is heated under a condition in which a liquid is in contact with the surface of said recording medium;

first heating means, coupled to said recording medium, for selectively heating the surface of said recording medium in accordance with image information;

first supplying means, coupled to said recording medium, for supplying a contact material to the surface of said recording medium, said contact material being selected from a liquid, vapor and a solid which generates or changes to either a vapor or a liquid under a condition of a temperature lower than a temperature at which the receding contact angle on the surface of the recording medium starts to decrease, wherein an adhesion area is formed, as a latent image, on the surface of said recording means when the surface of said recording medium is heated by said first heating means under a condition in which the contact material supplied from said first supplying means is in contact with the surface of said recording medium, the adhesion area having the receding contact angle whose value corresponds to a temperature on the surface of said recording medium heated by said first heating means; and adhering means, coupled to said recording means, for adhering a solid ink to the adhesion area so that the latent image formed on said recording medium is developed, said solid ink being defined as an ink whose softening temperature is higher than a room temperature and lower than a temperature at which the receding contact angle on the surface of said recording medium starts to decrease.

16. An apparatus as claimed in claim 15, wherein said adhering means comprises:

second heating means for heating the solid ink so that the solid ink is melted and maintained in liquid; and second supplying means, coupled to said heating means, for supplying the solid ink which is melted to the adhesion area formed on said recording medium, wherein said solid ink adhered to the adhesion area is normally cooled.

17. An apparatus as claimed in claim 16, wherein said second heating means comprises:

a container for containing the solid ink; and a heater for heating said container so that the solid ink is heated, said heater being activated when said apparatus is operated.

18. An apparatus as claimed in claim 15, wherein said adhering means comprises:

second heating means for heating the solid ink so that the solid ink is melted and maintained in liquid;

second supplying means, coupled to said heating means, for supplying the solid ink which is melted to the surface of said recording medium;

cooling means for cooling the solid ink supplied to the surface of said recording medium so that the solid ink is set on the surface of the recording medium; and separating means for separating a part of the solid ink which covers an area other than the adhesion area from the surface of said recording medium, so that the solid ink remains on the adhesion area.

19. An apparatus as claimed in claim 18, wherein said cooling means has a fun which generates a wind, the wind cooling the solid ink.

20. An apparatus as claimed in claim 18, wherein said cooling means has a block having a large thermal conductivity, said block absorbing a heat of the solid ink.

21. An apparatus as claimed in claim 20, wherein said block is formed of metal.

22. An apparatus as claimed in claim 20, wherein said block has fins which are formed on a surface of said block.

23. An apparatus as claimed in claim 15 further comprising:

transferring means, coupled to said recording medium, for transferring the solid ink adhered to the adhesion area formed on the surface of said recording medium to a recording sheet.

24. An apparatus as claimed in claim 23 further comprising:

third heating means for heating the surface of said recording medium under a condition where there is no liquid after the solid ink is transferred to the recording medium, whereby the receding contact angle on the adhesive area returns to an original value so that the latent image is disappeared from the surface of said recording medium.

25. An apparatus for forming an image comprising:

a recording medium which has a surface having a characteristic in which a receding contact angle decreases when said recording medium is heated under a condition in which a liquid is in contact with the surface of said recording medium:

first heating means, coupled to said recording medium, for selectively heating the surface of said recording medium in accordance with image information;

supplying means, coupled to said recording means, for supplying a solid ink which is melted to the surface of said recording medium, said solid ink being defined as an ink whose softening temperature is higher than a room temperature and lower than a temperature at which the receding contact angle on the surface of said recording medium starts to decrease, wherein the solid ink supplied from said supplying means is adhered to an adhesion area which is formed on the surface of said recording medium when the surface of said recording medium is heated by said first heating means under a condition in which the solid ink which is melted is in contact with the surface of said recording medium, the adhesive area having the receding contact angle whose value corresponds to a temperature on the surface of said recording medium heated by said first heating means, so that a visible image of the solid ink is formed on the surface of said recording medium.

26. An apparatus as claimed in claim 25, wherein said supplying means comprises:

second heating means for heating the solid ink so that the solid ink is melted and maintained in liquid, wherein the solid ink melted by said second heating means is supplied to the surface of said recording means.

27. An apparatus as claimed in claim 26 wherein said second heating means comprises:

a container for containing the solid ink; and a heater for heating said container so that the solid ink is heated, said heater being activated when said apparatus is operated.

28. An apparatus as claimed in claim 26 further comprising:

cooling means for cooling the solid ink supplied to the surface of said recording medium so that the solid ink is set on the surface of the recording medium; and separating means for separating a part of the solid ink which covers an area other than the adhesion area from the surface of said recording medium, so that the solid ink remains on the adhesion area.

29. An apparatus as claimed in claim 28, wherein said cooling means has a fun which generates a wind, the wind cooling the solid ink.

30. An apparatus as claimed in claim 28, wherein said cooling means has a block having a large thermal conductivity, said block absorbing a heat of the solid ink.

31. An apparatus as claimed in claim 30, wherein said block is formed of metal.

32. An apparatus as claimed in claim 30, wherein said block has fins which are formed on a surface of said block.

33. An apparatus as claimed in claim 25 further comprising:

transferring means, coupled to said recording medium, for transferring the solid ink adhered to the adhesion area formed on the surface of said recording medium to a recording sheet.

34. An apparatus as claimed in claim 33 further comprising:

third heating means for heating the surface of said recording medium under a condition where there is no liquid after the solid ink is transferred to the recording medium, whereby the receding contact angle on the adhesive area returns to an original value so that the latent image is disappeared from the surface of said recording medium.

* * * * *